April 8, 1952 A. R. MUNSON, SR 2,592,171

QUICK-CHANGE BAIT CASTING FISH LURE

Filed March 2, 1950

INVENTOR.

*Alonzo R. Munson, Sr.*

BY *Victor J. Evans & Co.*

ATTORNEYS

UNITED STATES PATENT OFFICE 2,592,171

QUICK-CHANGE BAIT CASTING FISH LURE

Alonzo R. Munson, Sr., Shreveport, La.

Application March 2, 1950, Serial No. 147,217

2 Claims. (Cl. 43—42.18)

This invention relates to fish lures of the type used in casting and particularly for use in traveling over lily pads and in which pork rinds are protected by or secured in buck tails, and in particular this invention relates to a fish lure in which the buck tail and pork rind are carried by a removable element that may readily be separated from the body of the lure and replaced.

The purpose of this invention is to provide a fish lure having a pork rind and buck tail carrying section in which a plurality of interchangeable pork rind and buck tail carrying sections are provided with one body and in which the said pork rind and buck tail sections are readily removable and replaceable.

In the usual type of fish lure of this type it is necessary to use screw drivers or wrenches to remove sections of the lure and it is therefore difficult to replace the bait carrying sections while fishing. With this thought in mind this invention contemplates an improved method of attaching bait carrying sections of a fish lure whereby the sections are snapped into position and may readily be removed and replaced without tools.

Another object of the invention is to provide a fish lure having interchangeable bait carrying sections in which the lure is shaped to facilitate traveling over lily pads and in which a spinner may be mounted on the forward end of the body thereof.

A further object of the invention is to provide an arcuate shaped fish lure, having interchangeable bait carrying sections, which is of a simple and economical construction.

With these and other objects and advantages in view the invention embodies a fish lure having a body with a spinner mounted on a line connecting link at the forward end of said body in which the body is provided with an elongated opening in its forward end and spaced slots adjacent its rear end positioned at the sides of a hook formed as a continuation of its trailing edge and a bait supporting section provided with an aperture through which a fish hook attached to the hook on the trailing edge of the body is extended, said bait supporting section being provided with a rolled forward end that is positioned to snap through the elongated opening of the body for removably retaining the bait supporting section on the body.

Other features and advantages of the invention will appear from the following description taken in connection with the drawings wherein.

Figure 1:
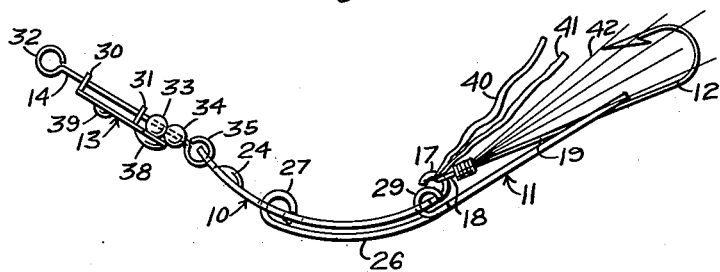
Figure 1 is a side elevational view of the improved fish lure with the parts assembled.
Figure 2:
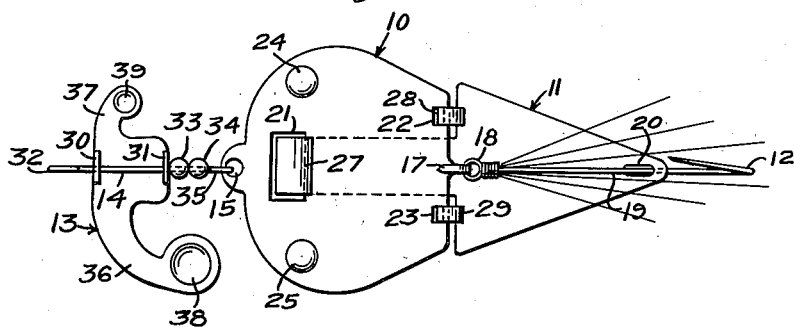
Figure 2 is a plan view of the lure as shown in Figure 1.
Figure 3:
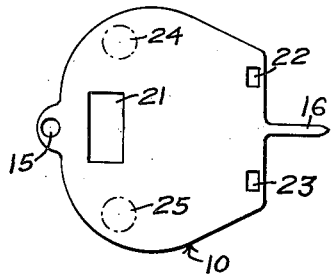
Figure 3 is a plan view of the body portion of the lure illustrating a blank from which the lure is formed.
Figure 4:
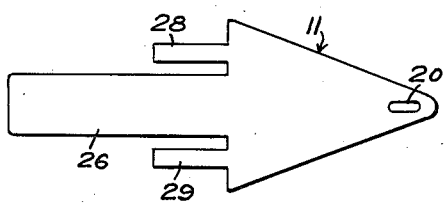
Figure 4 is a similar view showing the blank from which the bait carrying section of the lure is formed.

Referring now to the drawings wherein like reference characters denote corresponding parts the improved fish lure of this invention is formed with a body 10, a bait or hook supporting or guiding section 11, a fish hook 12 and a spinner 13 which is freely mounted on a line connecting link 14.

The body 10 is formed on an arcuate plate with an eye 15 at the forward end and an extended finger 16 at its rear edge, said extended finger being rolled to form a hook 17 upon which an eye 18 of the fish hook 12 is hooked with the shank 19 of the fish hook extended through an opening 20 in the trailing end of the supporting section 11.

The body 10 is provided with an elongated opening 21 spaced from its leading edge with spaced slots 22 and 23 adjacent its trailing edge, and the forward part of the body is also provided with beads 24 and 25 formed by indentations in the under surface and which, when filled with red lacquer, resemble eyes.

The section 11 is provided with a forwardly extended tongue 26 the end of which is formed to provide a roll 27 that is adapted to snap through the opening 21 of the body with small tongues 28 and 29 rolled to provide hooks which are extended through the slots 22 and 23.

The spinner 13 is provided with upwardly extended ears 30 and 31 through which the link 14 extends and the link is provided with an eye 32 on the forward end through which a fishing line is attached, and beads 33 and 34, the bead 33 providing a stop for the edge of the spinner. The link 14 is also provided with an eye 35 by which the link is attached to the eye 15 at the forward end of the body 10.

The spinner 13 is formed with a long arm 36 and a short arm 37 and the end of the arm 36 is provided with a cup shaped element 38, with a similar cup shaped element 39, of a smaller size on the end of the arm 37. With these elements positioned in this manner the spinner rotates as the lure is drawn through the water.

With the parts assembled pork rinds, as indicated by the numerals 40 and 41 may be positioned upon the eye 17 and the hook may also be provided with a buck tail as indicated by the numeral 42 for protecting or securing the pork rind.

The section 11 with the hook 12 extended therethrough is mounted on the section 10 by inserting the hooks 28 and 29 through the slots 22 and 23, respectively, hooking the eye 18 of the fish hook over the hook 17, and snapping the roll 27 through the elongated opening 21 of the body 10. Mounting the parts in this manner makes it possible to readily remove and replace the fish hook or bait supporting section 11 so that the body may be provided with interchangeable sections and a fisherman may readily change from one section to another.

It will be understood that modifications may be made in the design and arrangement of the parts without departing from the spirit of the invention.

What is claimed is:

1. In a fish lure, the combination which comprises a plate-like arcuate shaped body having a line attaching eye in the forward part thereof and spaced slots in the trailing portion thereof, said body also having an elongated opening formed therethrough at a point spaced from its leading edge, and a triangular shaped supporting plate hingedly connected to the trailing portion of the arcuate shaped body by means of hooks which extend through the spaced slots in the said trailing part of the body said supporting plate having a tongue formed with a roll at its forward end extending from its leading edge for engagement with the said arcuate shaped body through the said elongated opening thereof, a fish hook freely attached to the trailing portion of the arcuate shaped body and extended through an aperture in the triangular shaped supporting plate, pork rinds extended from the connection of the fish hook to the arcuate shaped body and a buck-tail carried by the said hook.

2. A fish lure comprising a plate like arcuate shaped body having a line attached eye formed in the forward part thereof and a hook extended upwardly from its trailing edge, said body having slots formed therethrough adjacent its trailing edge, and an elongated opening therein spaced from the leading edge thereof, a hook guiding section having hooks formed as a continuation of the leading edge positioned to extend through the slots adjacent the trailing edge of the body, said hook guiding section having a tongue formed with a roll at its forward end extending from the leading edge thereof and a slot in the trailing end thereof, the roll on the forward end of said tongue being positioned to snap through the elongated opening adjacent the leading edge of the body, a fish hook having a shank with an eye formed at one end thereof positioned over the said hook guiding section with the shank of the hook extended through the slot in the trailing end thereof and with the eye of the shank positioned over the hook on the trailing edge of the body, pork rinds carried by the hook on the trailing edge of the body and a buck tail positioned on the fish hook.

ALONZO R. MUNSON, Sr.

REFERENCES CITED

The following references are of record in the file of this patent:

UNITED STATES PATENTS

| Number | Name | Date |
| --- | --- | --- |
| 1,738,617 | Scharrer | Dec. 10, 1929 |
| 1,740,273 | Shannon | Dec. 17, 1929 |
| 1,755,647 | Harvey | Apr. 22, 1930 |
| 2,319,026 | Adams | May 11, 1943 |